US012775590B1

(12) United States Patent
Xu et al.

(10) Patent No.: US 12,775,590 B1
(45) Date of Patent: Oct. 27, 2026

(54) AUTOMATIC GEOPHYSICAL LOG QUALITY RANKING AND DATA EDITING WITH MACHINE LEARNING

(71) Applicant: Saudi Arabian Oil Company, Dhahran (SA)

(72) Inventors: Chicheng Xu, Houston, TX (US); Lei Fu, Houston, TX (US); Weichang Li, Katy, TX (US); Nawaf Abdullah Alhelal, Dhahran (SA); Eyad F. Aljishi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/283,862

(22) Filed: Jul. 29, 2025

(51) Int. Cl.
*G06F 16/00* (2019.01)
*G06F 16/18* (2019.01)

(52) U.S. Cl.
CPC ................................ *G06F 16/1805* (2019.01)

(58) Field of Classification Search
CPC ................................................... G06F 16/1805
See application file for complete search history.

(56) References Cited

U.S. PATENT DOCUMENTS

2010/0312477 A1 12/2010 Sanstrom et al.
2018/0038992 A1 2/2018 Macdonald et al.
2021/0301655 A1 9/2021 Ranganathan et al.
2023/0306007 A1* 9/2023 Muthukrishnan ... G06F 11/0775

OTHER PUBLICATIONS

Akkurt et al., Accelerating and Enhancing Petrophysical Analysis with Machine Learning: A Case Study of an Automated System for Well Log Outlier Detection and Reconstruction, presented at the SPWLA 59th Annual Logging Symposium, Jun. 2-6, 2018, London, UK, 6 pages (Abstract Only).

Ali et al., "A Novel Machine Learning Approach for Detecting Outliers, Rebuilding Well Logs, and Enhancing Reservoir Characterization," Natural Resources Research, Mar. 2023, 32(3):1047-1066, 20 pages.

Banas et al., "Novel Methodology for Automation of Bad Well Log Data Identification and Repair," presented at the SPWLA 62nd Annual Logging Symposium, May 17-20, 2021, held virtually, 2 pages (Abstract Only).

International Search Report and Written Opinion in International Appln. No. PCT/US2025/047768, mailed on Mar. 31, 2026, 15 pages.

(Continued)

*Primary Examiner* — Ajith Jacob
(74) *Attorney, Agent, or Firm* — Fish & Richardson P.C.

(57) ABSTRACT

A computer implemented method that enables data editing is described. The method includes determining cutoffs associated with a differential caliper log and cutoffs associated with a density correction log and applying the cutoffs to a cross-plot of a differential caliper log and a density correction log. The method includes categorizing a quality of respective datapoints in the cross-plot according to a confidence level and training a machine learning model using datapoints that satisfy a confidence threshold. The method also includes replacing low confidence datapoints in a well log with modeled datapoints by inputting a well log to the trained machine learning model to obtain a modeled well log.

20 Claims, 14 Drawing Sheets

(56) References Cited

OTHER PUBLICATIONS

McDonald et al., "Data Quality Considerations for Petrophysical Machine Learning Models," presented at the SPWLA 62nd Annual Logging Symposium, May 17-20, 2021, held virtually, 25 pages.

Singh et al., "Machine Learning Assisted Petrophysical Logs Quality Control, Editing and Reconstruction," presented at the Abu Dhabi International Petroleum Exhibition & Conference, Abu Dhabi, UAE, Nov. 9-12, 2020, 2 pages (Abstract Only).

* cited by examiner

Continued on FIG. 10A

AUTOMATIC GEOPHYSICAL LOG QUALITY RANKING AND DATA EDITING WITH MACHINE LEARNING

TECHNICAL FIELD

This disclosure relates generally to data editing of well logs.

BACKGROUND

Well logging captures a record of the geologic formations penetrated by a borehole. A well log is based on physical measurements made by geophysical tools lowered into the borehole. The well logs are used throughout the life cycle of oil and gas assets, from initial exploration to the planning, development, and management of drilled wells.

DETAILED DESCRIPTION

Well logs are acquired to quantify various rock properties in subsurface. For example, bulk density log and sonic logs are used to derive compressional slowness and shear slowness and are used in both petrophysical property estimation and geophysical workflows. Petrophysical property estimation includes estimation of porosity, water saturation, and the like. Geophysical workflows include, for example, well-seismic tie. However, both bulk density log and sonic logs are shallow sensing with a depth of investigation of less than 1 foot (ft). Therefore, both the bulk density log and the sonic logs are sensitive to borehole conditions, such as rugosity. Additionally, bulk density log and sonic logs can include zones where logging tools fail to capture accurate data, such as washout zones. Logging tools may also malfunction during data acquisition operations which typically leads to missing data intervals within well logs.

Editing geophysical well logs to replace missing or bad datapoints is laborious, subjective and error prone. In some cases, traditional workflows start with predefined empirical cutoffs for quality control logs (DRHO and DCAL) to identify bad quality data and then use statistical regression to generate pseudo logs based on other logs.

The present techniques enable automatic geophysical log quality ranking and data editing with machine learning. In some embodiments, cutoffs associated with a differential caliper log and cutoffs associated with a density correction log are automatically determined based on, at least in part, a Gaussian mixture model. The cutoffs are applied to a cross-plot of the differential caliper log and the density correction log. Datapoint quality in the cross-plot is categorized according to a confidence level. A machine learning model is trained using datapoints that meet the confidence level. Datapoints in a well log are replaced with modeled datapoints by inputting the well logs to the trained machine learning model to obtain the modeled well logs.

Some advantages of the present techniques include an improvement to well log quality by automatically determining datapoints, ranking confidences associated with datapoints, and replacing bad quality datapoints. In some embodiments, the present techniques enable wellbore evaluations in real-time, as well log data is logged while drilling, and the data edited in real time to increase a quality of the well logs. In this way, the present techniques ensure that interpretations and decisions are made using well log data that are accurate and precise, thereby avoiding erroneous data that may lead to erroneous decisions or misinterpretations.

Figure 1:
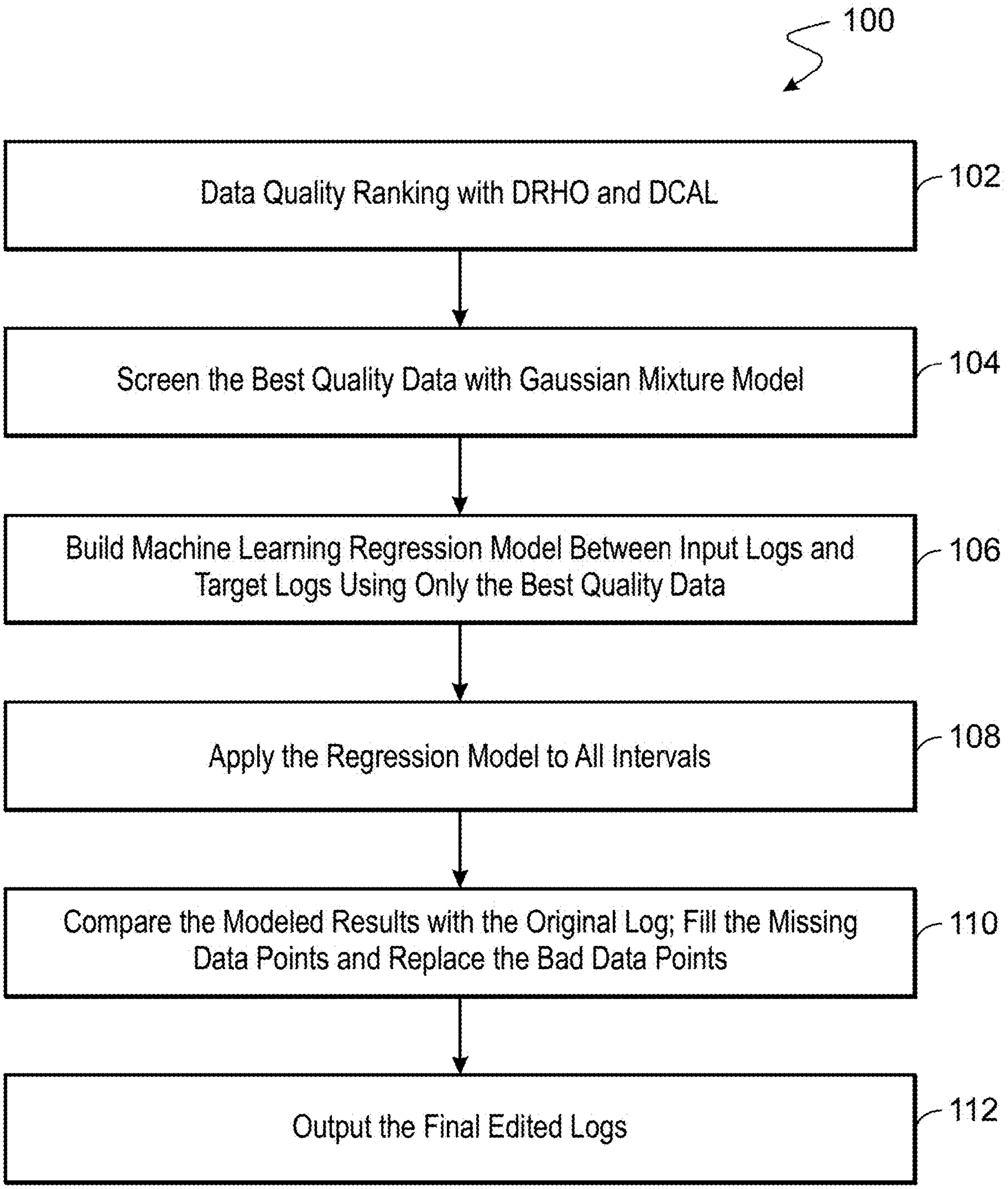
FIG. 1 is a flowchart showing a process that enables automatic geophysical log quality ranking and data editing with machine learning.

FIG. 1 is a flowchart showing a process 100 that enables automatic geophysical log quality ranking and data editing with machine learning. In some embodiments, the process 100 is implemented by the controller of FIG. 12. In the example of FIG. 1, logging tools are used to obtain data that quantifies various rock properties during logging while drilling (LWD). For example, captured well logs include resistivity logs, borehole image logs, porosity logs, density logs, neutron porosity logs, sonic logs, lithology logs, self/spontaneous potential logs, nuclear magnetic resonance logs, spectral acoustic logs, corrosion well logs, and any combinations thereof. During LWD, the measured data is transmitted to the surface in real time.

Borehole conditions impact the quality of the captured data. In examples, a washout zone is an enlarged region of a wellbore. A washout zone can have an irregular well bore size and shape, and a washout in an openhole section is larger than the original hole size or size of the drill bit. Washout enlargement can be caused by drilling activities, excessive bit jet velocity, soft or unconsolidated formations, in-situ rock stresses, mechanical damage by bottomhole assembly components, chemical attack and swelling or weakening of shale as it contacts fresh water. Well log data captured in these zones is often filled with errors or incomplete. The present techniques enable editing of the well logs in real time.

In some embodiments, the data editing is based on, at least in part, quality control logs captured while drilling. The present techniques automatically categorize well log data quality according to confidences in the datapoints and edit the datapoints using machine learning algorithms. In examples, the present techniques are applied to automatically edit/fill well logs including bulk density and sonic logs. Ranking is applied to levels of confidence associated with the well log data quality.

At block 102, quality control logs associated with the well logs are visualized in histograms. In examples, a differential caliper log measures the diameter of the borehole, using either mechanical arms or through high-frequency acoustic signals. The differential caliper log can indicate where logs are potentially compromised due to the borehole being either over-gauged (e.g., due to washout) or under-gauged (e.g., like mudcake buildup). Density correction logs represent the difference between short- and long-spaced density measurements and provide an indication of the quality of the logged bulk density data. In examples, the quality control logs associated with the well logs are derivative logs. Derivative logs, for example, are logs calculated from other well logs to find the rate at which a respective well log is changing with depth. For example, a differential caliper log calculates the rate at which the caliper is changing from one depth to another. Bad hole conditions that cause the incorrect measurements in the density log are likely related to the rugosity of the hole more than the hole size, and the differential caliper log is an indicator of rugosity.

Figure 2:
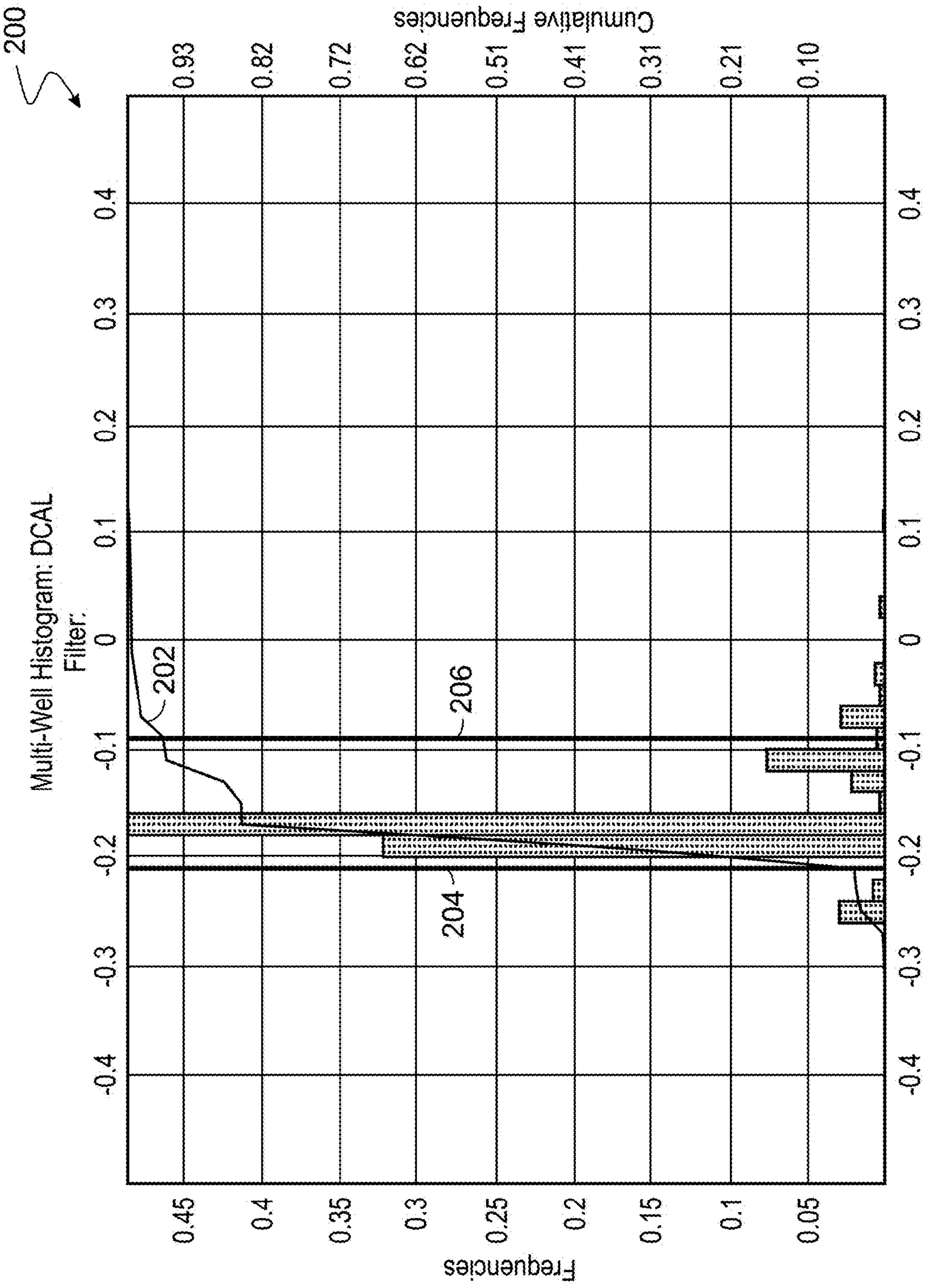
FIG. 2 shows a visualization of a differential caliper (DCAL) log using Gaussian Mixture model.
Figure 3:
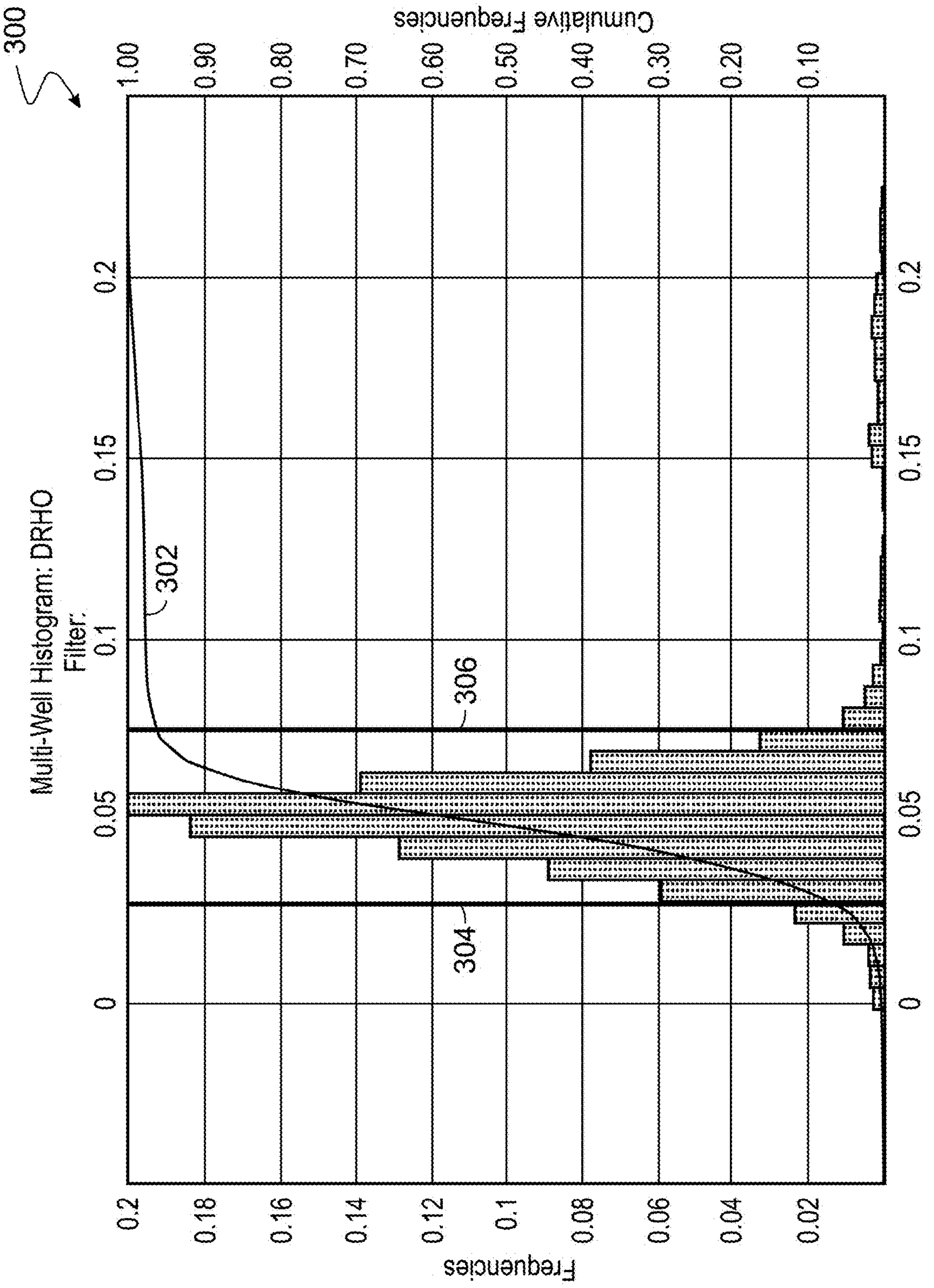
FIG. 3 shows a visualization of a density correction (DRHO) log using Gaussian Mixture model.

In some embodiments, a Gaussian mixture model is applied to each of the differential caliper log and the density correction log. For example, the Gaussian mixture model determines a probability that each datapoint of the respective log belongs to a particular cluster. Histograms are used to plot the respective distribution of the Gaussian mixture model. In some embodiments, automatic identification and ranking (e.g., categorizing) of datapoints based on the Gaussian mixture models is used to determine data quality. FIG. 2 shows a visualization of a differential caliper log using Gaussian mixture model. FIG. 3 shows a visualization of a density correction log using Gaussian mixture model. In of FIG. 2 and FIG. 3, the distribution of datapoints is shown in the respective histograms.

In some embodiments, the Gaussian mixture model is used to determine cutoffs that categorizing the datapoints. The cutoffs serve as boundaries between levels of the quality associated with the datapoints in the logs. In examples, the differential caliper logs and density correction logs are quality indicators for bulk density, sonic, and borehole conditions. For example, good quality data is associated with datapoints where both the differential caliper log and the density correction log are close to zero. In examples, bad quality data is associated with datapoints where both the differential caliper log and the density correction log are large.

In some embodiments, cumulative probability density functions are derived from the Gaussian mixture models. In the example of FIG. 2, the cumulative probability density function is shown by line 202. In the example of FIG. 3, the cumulative probability density function is shown by line 302. In some embodiments, the gradient of the respective cumulative probability density function has an abrupt change at inflection points. In examples, the abrupt change is a point of the cumulative probability density function at which a change in the direction of curvature occurs. In some embodiments, the inflection points correspond to a cross or overlap between at least two neighboring Gaussian distributions of the cumulative probability density function. In FIG. 2, inflection points are associated with line 204 and line 206. In FIG. 3, inflection points are associated with line 304 and line 306.

Figure 4:
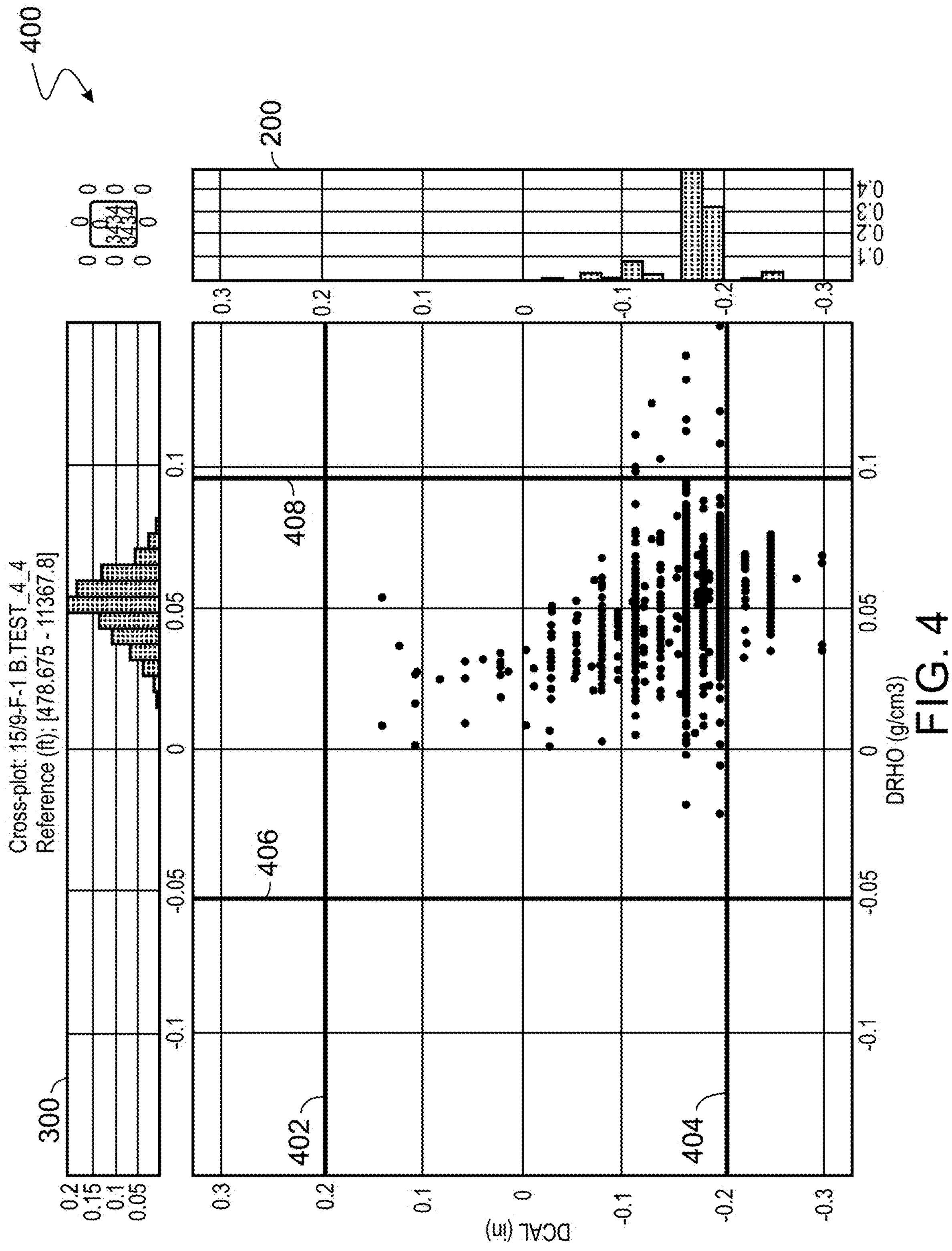
FIG. 4 shows a DRHO-DCAL cross plot.

In some embodiments, the inflection points are transformed into cutoffs that categorize or rank corresponding well logs including bulk density logs and sonic logs. The detected inflection points (e.g., the cross between at least two neighboring Gaussian distributions) on a respective cumulative probability density function correspond to boundaries between different classes/groups of datapoints in the well logs subject to editing. The datapoints in the well logs are automatically categorized or ranked according to confidences in their respective quality based on, at least in part, the cutoffs. In some embodiments, the detected cutoffs are transformed by applying the detected cutoffs to a cross plot of the differential caliper logs and the density correction logs. FIG. 4 shows a DRHO-DCAL cross plot 400. The data quality is categorized according to a confidence level associated with areas of the plot. In the example of FIG. 4, the density correction values (e.g., FIG. 200) are plotted along the x-axis and the differential caliper values (e.g., FIG. 300) are plotted along the y-axis. Inflection points 204 and 206 of FIG. 2 and inflection points 304 and 306 of FIG. 3 are transformed into the cutoffs 402, 404, 406, and 408. The cutoffs 402, 404, 406, and 408 are shown applied to the DRHO-DCAL cross plot. The cutoffs 402-408 segment the datapoints into categories with varying levels confidence and data quality. Accordingly, the confidence level is determined based on a combination of the differential caliper logs and the density correction logs.

Figure 5:
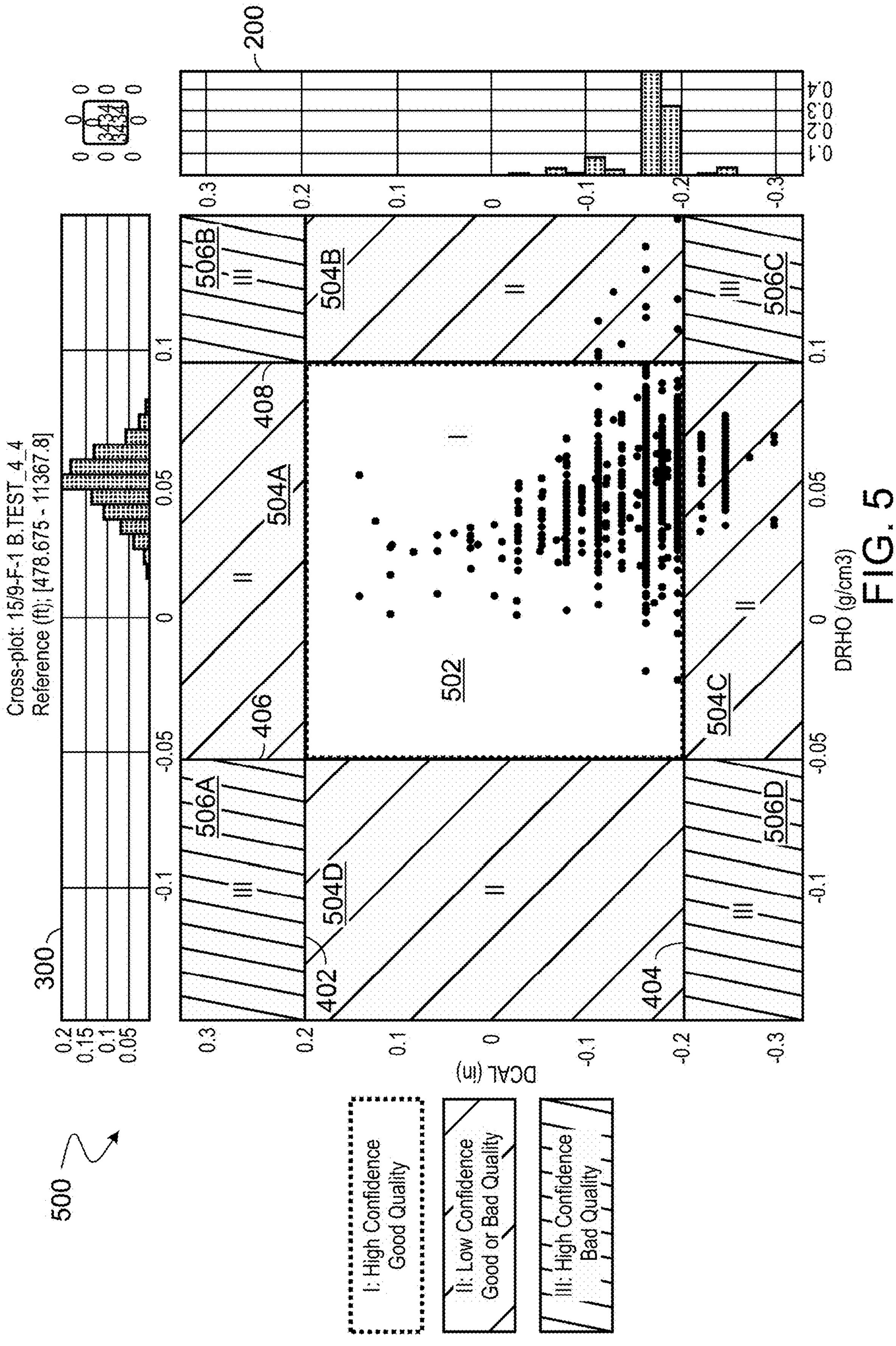
FIG. 5 shows confidence levels associated with datapoints categorized according to their confidence level.

FIG. 5 shows datapoints categorized according to their respective confidence level with varying data quality. In some embodiments, each datapoint is associated with a high confidence of accuracy or a low confidence of accuracy. In examples, the cutoffs 402, 404, 406, and 408 are used to segment the datapoints into categories 502, 504A, 504B, 504C, 504D, 506A, 506B, 506C, and 506D. Category 502 is associated with a high confidence and includes good quality data. Categories 504A, 504B, 504C, and 504D (collectively referred to as category 504) are associated with a low confidence and include good quality or bad quality data. Categories 506A, 506B, 506C, and 506D (collectively referred to as category 506) are associated with a high confidence and include bad quality data.

In examples, a highest confidence of good quality datapoints is found in datapoints that satisfy high cutoffs and low cutoffs as derived from the differential caliper logs and the density correction logs, as shown in category 502. A highest confidence of bad quality datapoints is found in datapoints that do not satisfy high cutoffs and low cutoffs as derived from the differential caliper logs and the density correction logs, as shown in category 506. A low confidence of high or bad quality datapoints is found in datapoints that do not satisfy at least one of high cutoffs or low cutoffs as derived from the differential caliper logs and the density correction logs, as shown in category 504.

Referring again to FIG. 1, at block 104, training data is obtained by screening the differential caliper logs and the density correction logs to extract good quality datapoints, such as the datapoints of category 502 (FIG. 5). The cutoffs are applied to the differential caliper logs and the density correction logs to extract the good quality datapoints.

At block 106, a machine learning regression model is built that takes as input well logs and outputs edited target logs using the categorized data. In some embodiments, a machine learning regression model is trained using the good quality datapoints that satisfy cutoffs associated with the differential caliper logs and the density correction logs. The good quality datapoints are extracted from the differential caliper logs and the density correction logs based on the cutoffs.

In some embodiments, the machine learning model is an XGBoost. The hyperparameters of the machine learning model are tuned to a best condition to achieve the accurate predictions. The best condition is a combination of hyperparameters in the machine learning model that output accurate predictions as compared to the ground truth, labeled input data. Hyperparameters of the machine learning model are tuned for accuracy by executing a large number of trained machine learning models with varying combinations of hyperparameters. The combination of trained machine learning models with prediction accuracies above a predetermined threshold are used to select the tuned parameters of trained machine learning models.

At block 108, the trained machine learning model with tuned parameters is applied to well logs of the well at various drilled intervals. In some embodiments, inputs to the trained machine learning model include bulk density logs, sonic logs, gamma ray logs, neutron porosity logs, deep resistivity logs, or compressional slowness logs. In some embodiments, the output of the trained machine learning model includes edited bulk density logs, sonic logs, gamma ray logs, neutron porosity logs, deep resistivity logs, or compressional slowness logs.

Figure 6:
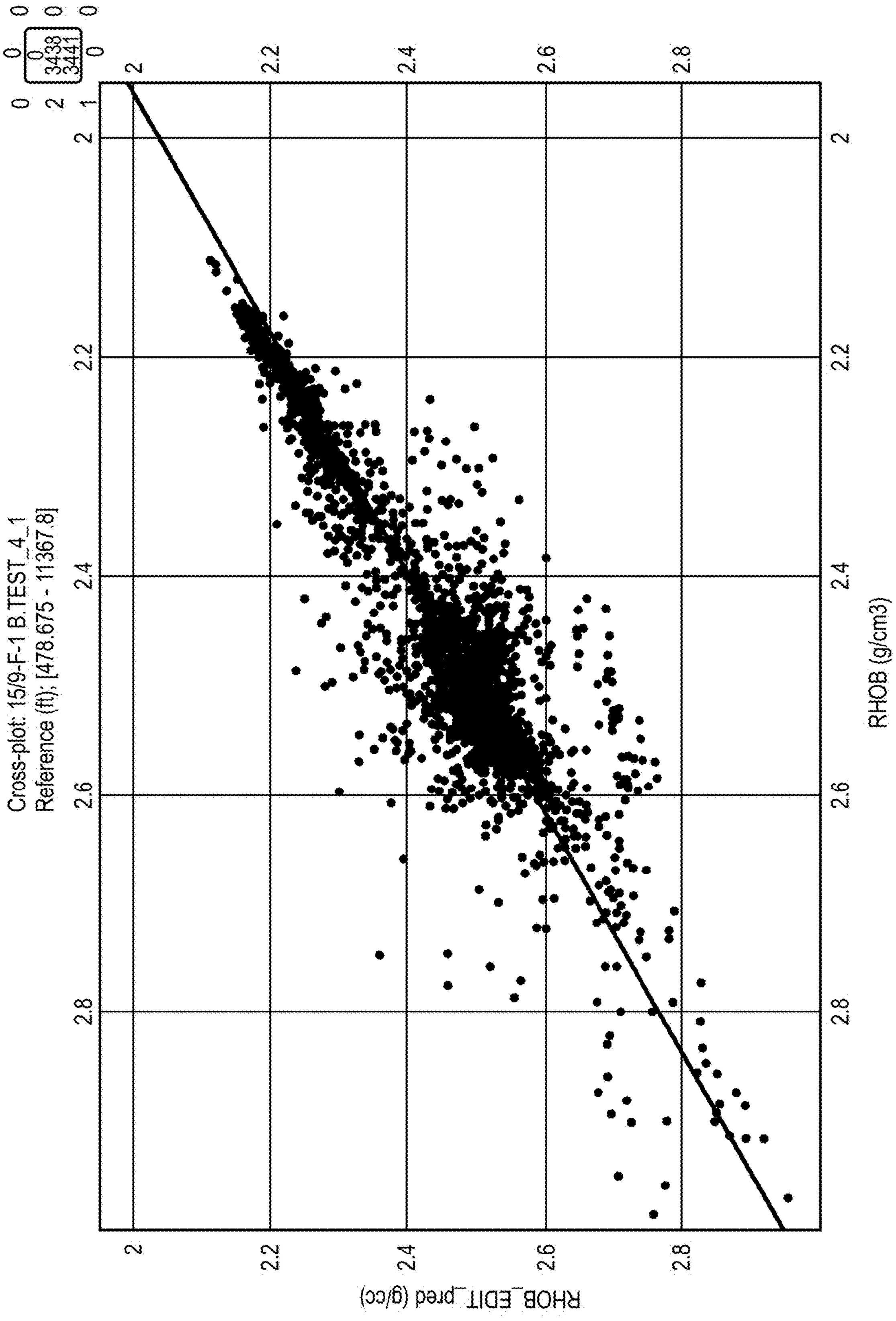
FIG. 6 shows a first comparison of the output of trained machine learning models.
Figure 7:
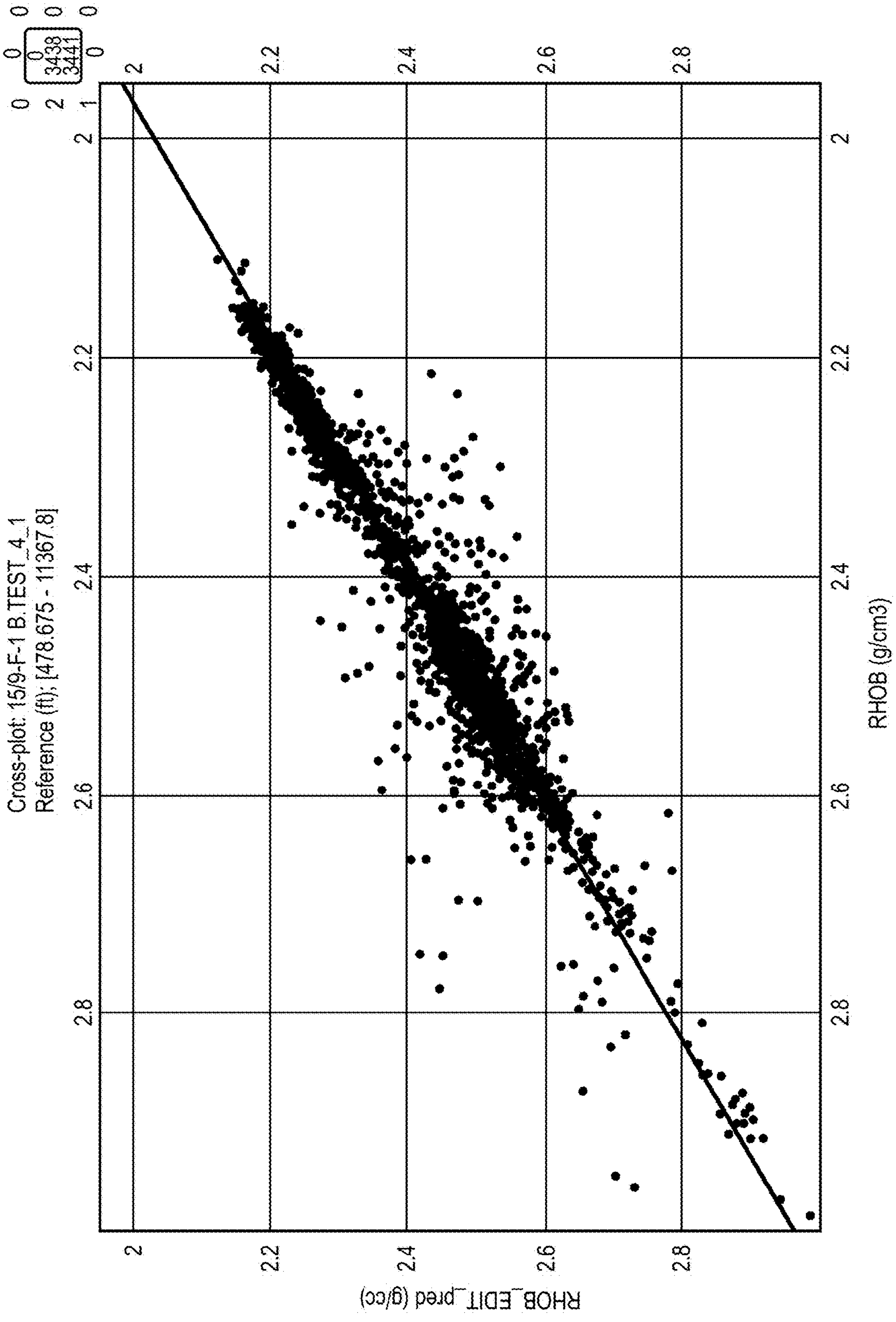
FIG. 7 shows a second comparison of the output of trained machine learning models.
Figure 8:
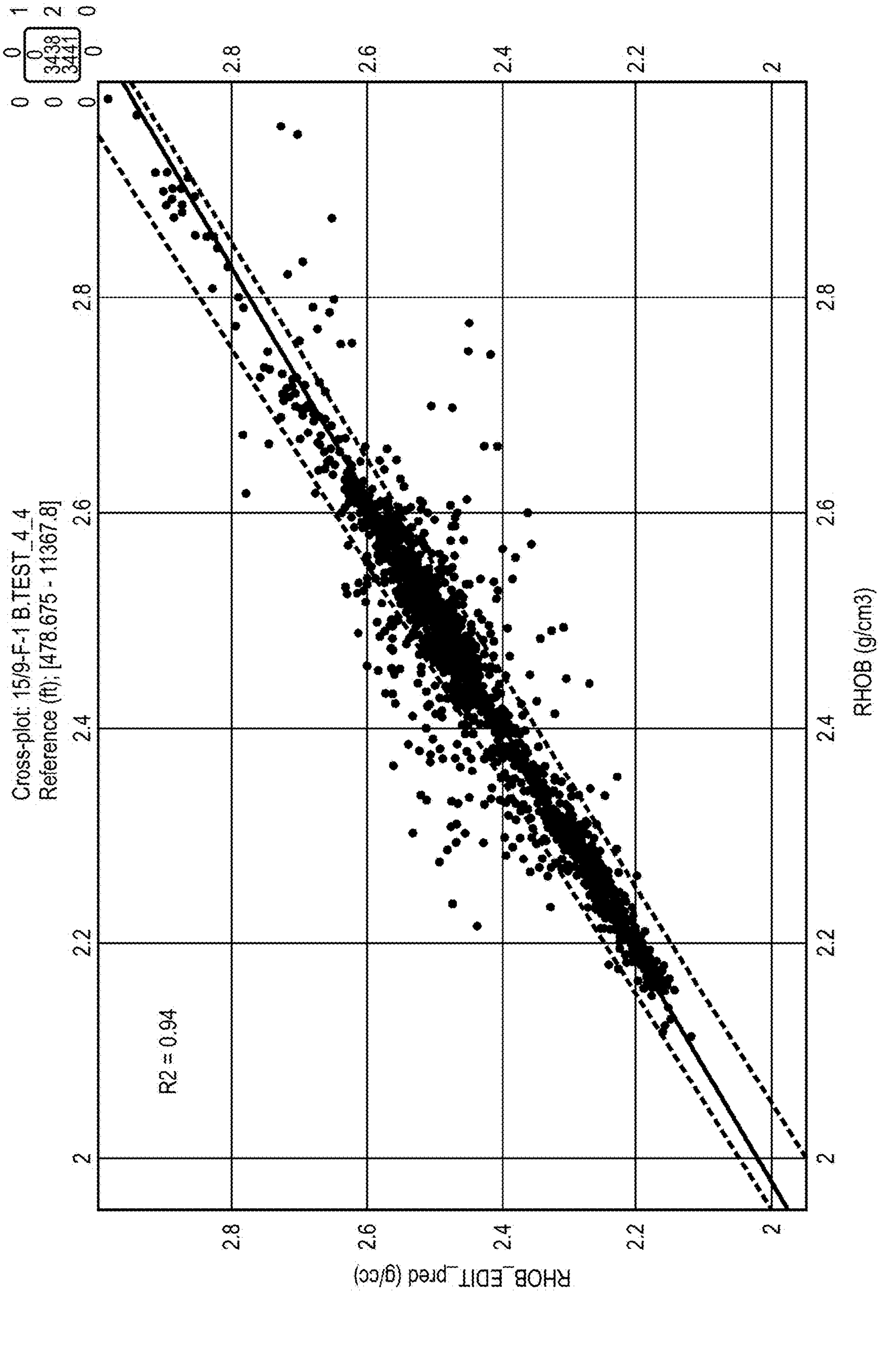
FIG. 8 shows a third comparison of the output of trained machine learning models.
Figure 9:
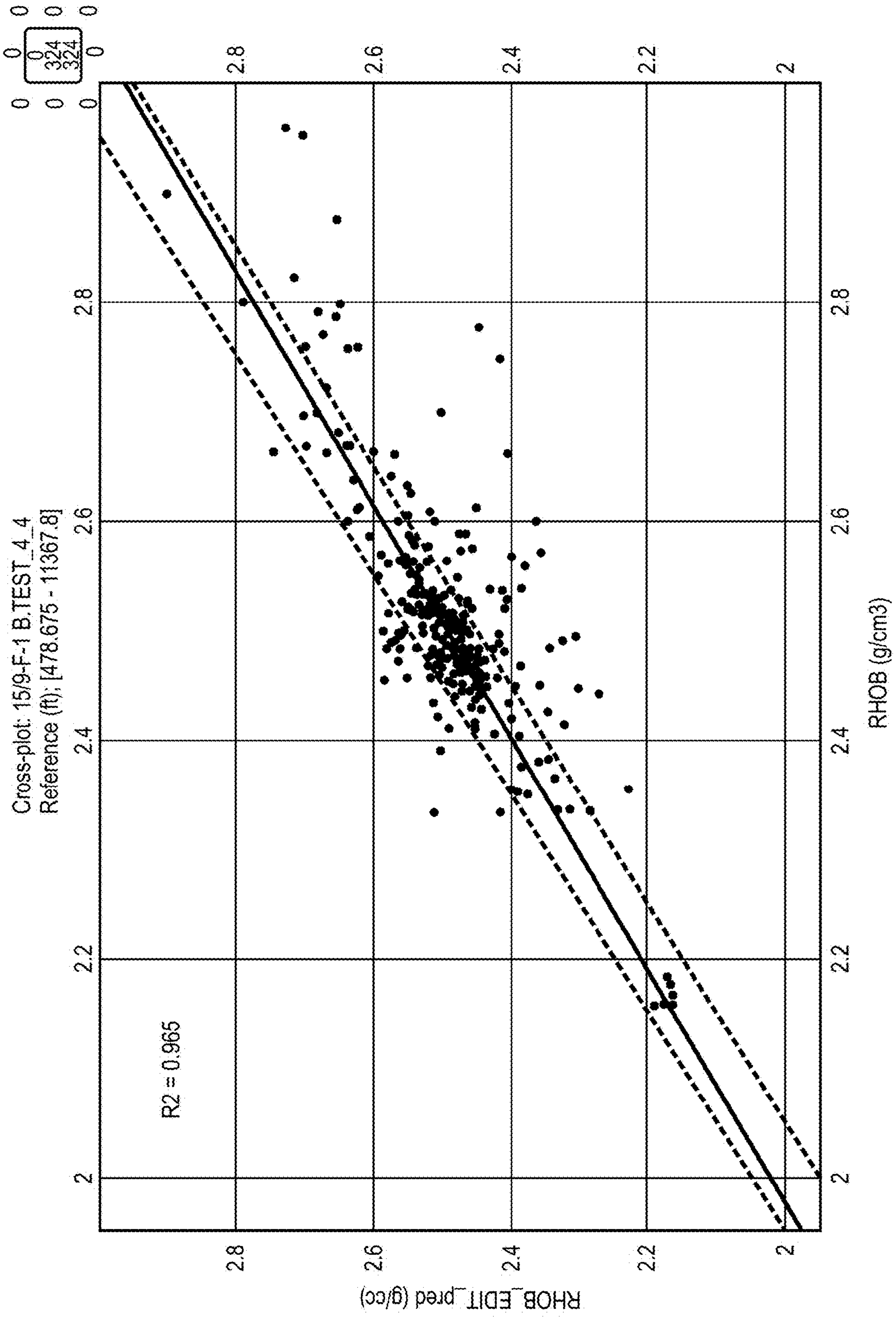
FIG. 9 shows a fourth comparison of the output of trained machine learning models.

FIG. 6, FIG. 7, FIG. 8, and FIG. 9 show a comparison of the output of trained machine learning models. FIG. 6 shows a correlation between the modeled results and the original input logs shows R2=0.86 before optimizing the XGBoost hyperparameters and the number of points used in the model. FIG. 7 shows a correlation between the modeled results and the original logs shows R2=0.94 after optimizing the XGBoost hyperparameters and the number of points used in the model. FIG. 8 shows a correlation between the modeled results and the original logs for all points. FIG. 9 shows a correlation between the modeled results and the original logs for category 504 and 506 datapoints (FIG. 5) which are not used to train the machine learning models. In some embodiments, the correlations in FIG. 8 and FIG. 9 are used as the metrics to quantify the accuracy of the machine learning models.

Figure 10A:
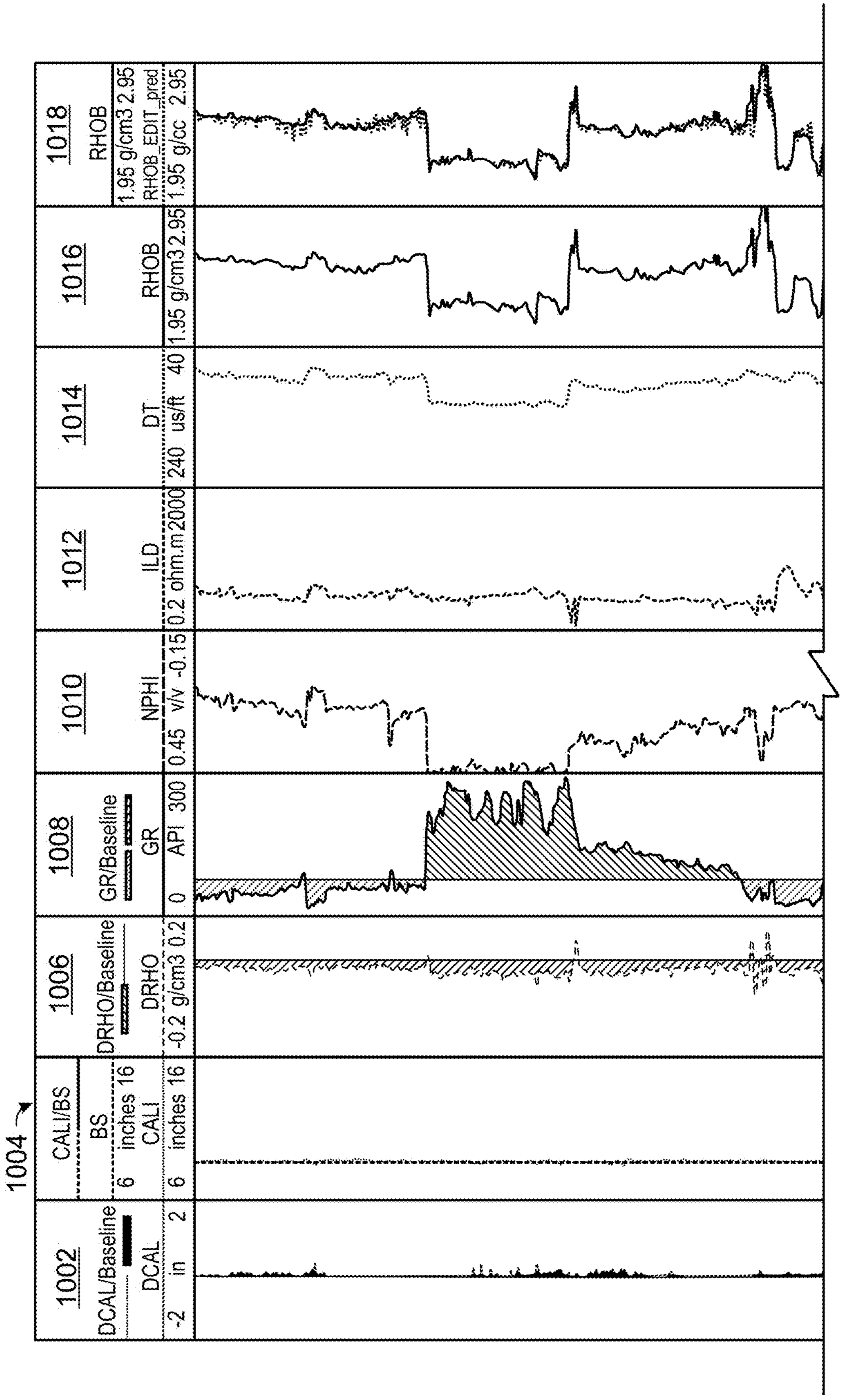
FIGS. 10A and 10B shows quality control logs, input logs, and an edited bulk density log.
Figure 10B:
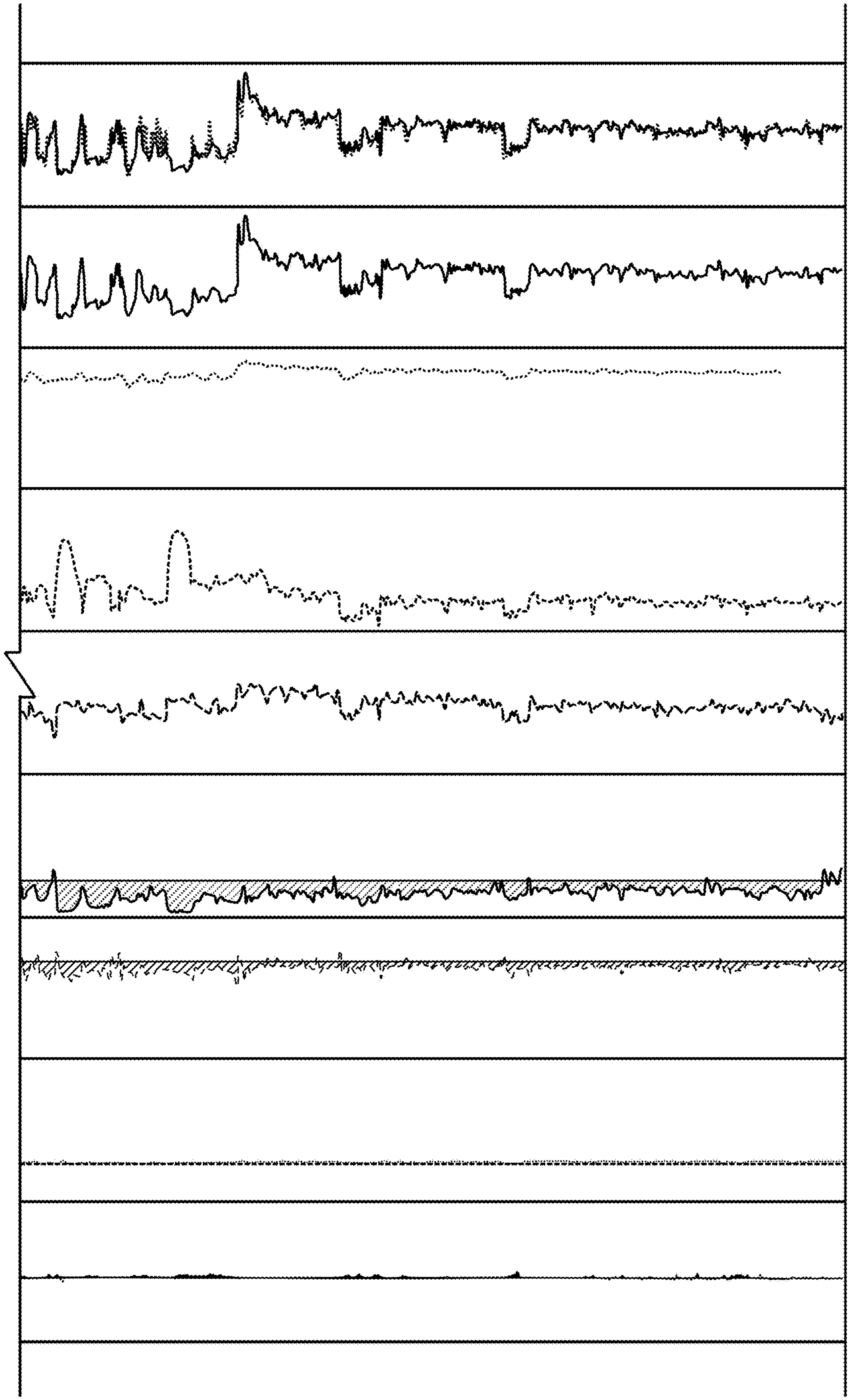

Referring again to FIG. 1, at block 110, the output of the trained machine learning model is compared with the original measured log. FIGS. 10A and 10B shows quality control logs, input logs, and an edited bulk density log. In the example of FIGS. 10A and 10B, the logs include a differential caliper log 1002, caliper log 1004, density correction log 1006, gamma ray 1008, neutron porosity 1010, deep induction log 1012, compressional slowness log 1014, measured bulk density log 1016, and the edited bulk density log 1018. The edited bulk density log 1018 shows the comparison of the measure log curve (black, RHOB) and the machine learning predicted log (red, RHOB_EDIT_Pred). The black RHOB curve is the original which has some missing points or bad datapoints. In examples, the datapoints that are replaced in the original well logs are bad quality datapoints with a high confidence, such as datapoints in category 506 (FIG. 5). Accordingly, in the edited bulk density log 1018 output by the trained machine learning model, bad quality datapoints corresponding to category 506 (FIG. 5) are replaced with a datapoint output by the trained machine learning model.

In examples, for missing datapoints (e.g., log intervals with no data or null data) the datapoints are filled with datapoints output by the trained machine learning model. In examples, the datapoints are missing due to tool malfunction. In some embodiments, for bad quality datapoints with a high confidence, the datapoints are replaced with datapoints as predicted by the trained machine learning model. In examples, for low confidence datapoints (e.g., good or bad quality datapoints, category 504 of FIG. 5), the datapoints are replaced when a difference between a datapoint output by the trained machine learning model and a respective low confidence datapoint from the well log satisfies a predefined threshold. For example, the low confidence datapoint is replaced when a model-log difference satisfies a predefined threshold (e.g., 0.05 grams per cubic centimeter (g/cc)). For low confidence datapoints, the original measurement value is retained in the edited well log if the value output by the trained machine learning model and low confidence well log value satisfies the threshold. In some embodiments, the threshold is determined by human expert, derived from the histogram distributions, or derived by cluster analysis.

Figure 11:
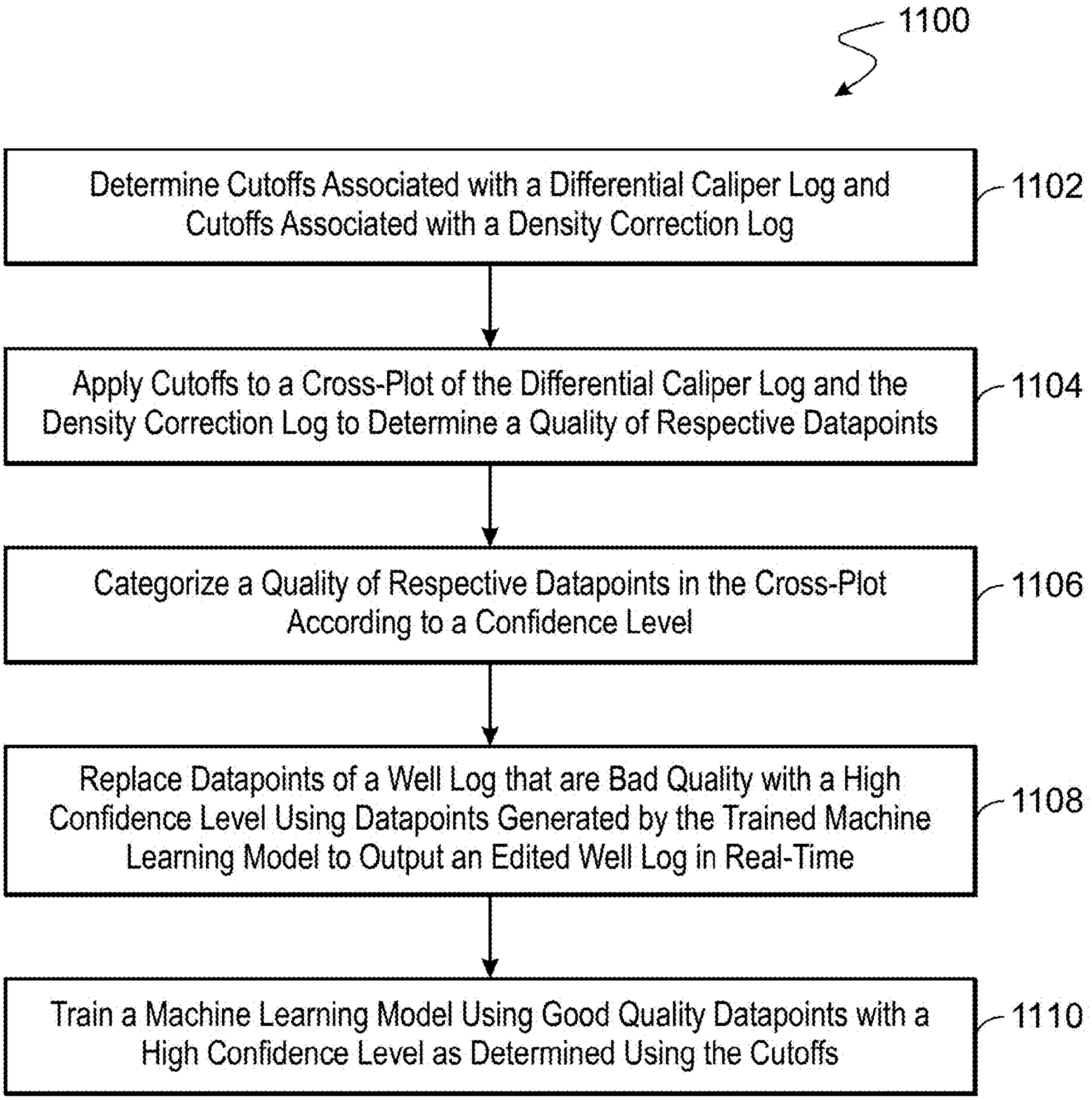
FIG. 11 is a process flow diagram of a process that enables automatic geophysical log quality ranking and data editing with machine learning.

FIG. 11 is a process flow diagram of a process 1100 that enables automatic geophysical log quality ranking and data editing with machine learning.

At block 1102, cutoffs associated with a differential caliper log and cutoffs associated with a density correction log are determined. In examples, the cutoffs are determined using a Gaussian mixture model. In examples, the Gaussian mixture models are applied to each of the differential caliper log and the density correction log, respectively. Inflection points of cumulative probability density functions derived from the Gaussian mixture models are determined. The inflection points correspond to cutoffs associated with the differential caliper log and cutoffs associated with the density correction log.

At block 1104, the cutoffs are applied to a cross-plot of the differential caliper log and the density correction log to determine a quality of respective datapoints. In examples, the datapoints are categorized in the cross-plot according to a confidence level.

At block 1106, a machine learning model is trained using datapoints that satisfy a confidence threshold. In examples, the machine learning model is trained using training data obtained by screening the differential caliper logs and the density correction logs to extract good quality datapoints. Good quality datapoints are datapoints with a high confidence of having good quality data when compared to other datapoints on a cross plot with derived cutoffs.

At block 1108, datapoints in a well log are replaced with modeled datapoints by inputting the well log to the trained machine learning model to obtain the edited well log. In this manner, data quality is automatically ranked with quality control logs such as the differential caliper log and the density correction log. The highest quality data is selected for training using Gaussian mixture model. In some embodiments, the edited well logs are used for subsequent petrophysical interpretation of reservoir properties such as porosity, saturation, and permeability. In some embodiments, the edited well logs are used to generate pseudo seismic traces to be compared with the measured seismic data to tie the well with seismic for mapping reservoir properties in the field. For example, the edited well logs are used to complete petrophysical or geophysical reservoir characterization workflows.

The edited well logs enhance the accuracy and utility of subsurface interpretations. By replacing or supplementing captured datapoints with modeled values, more continuous and reliable representations of the subsurface are generated, especially in zones where measurements are sparse or affected by tool limitations. The enhanced continuity of the edited well logs directly enables the continuous and reliable representations of the subsurface. Moreover, the edited well logs improves reservoir characterization by enabling better estimation of key properties like porosity, permeability, and fluid saturation, providing a more detailed understanding of reservoir quality and behavior. In drilling operations, edited well logs support real-time geosteering and hazard avoidance by providing continuous insights into formation boundaries and pressure zones. Edited well logs are used in formation evaluation, enabling the identification of lithology and fluid types more accurately. Furthermore, the edited well logs are used to build static and dynamic reservoir models that drive simulations forecast production and optimize field development. The edited data logs also serve as high-quality inputs for machine learning models and cross-well correlations, ultimately reducing uncertainty in decision-making and improving the evaluation of assets.

Figure 12:
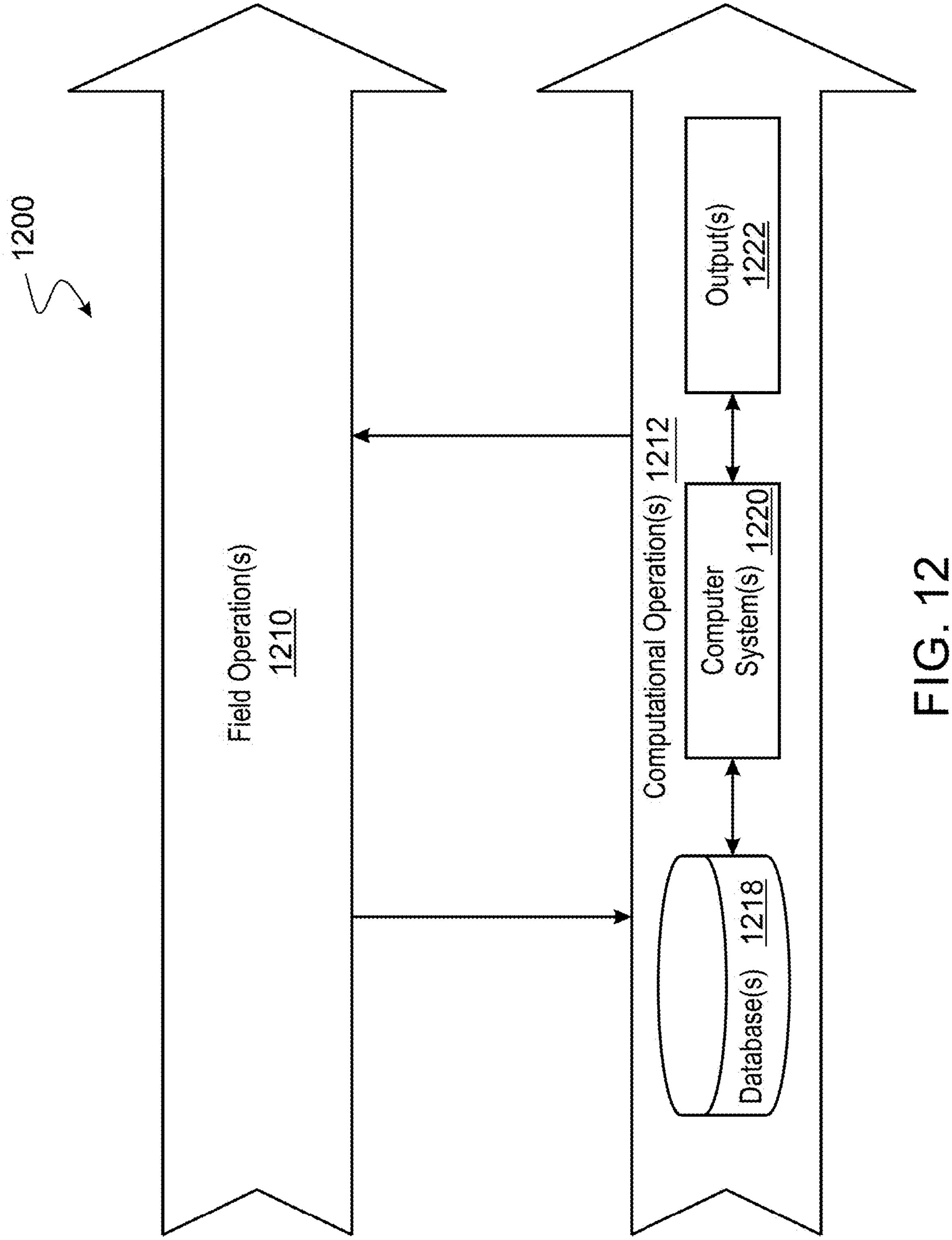
FIG. 12 illustrates hydrocarbon production operations that include both one or more field operations and one or more computational operations, which exchange information and control exploration for the production of hydrocarbons.

FIG. 12 illustrates hydrocarbon production operations 1200 that include both one or more field operations 1210 and one or more computational operations 1212, which exchange information and control exploration for the production of hydrocarbons. In some implementations, outputs of techniques of the present disclosure can be performed before, during, or in combination with the hydrocarbon production operations 1200, specifically, for example, either as field operations 1210 or computational operations 1212, or both.

Examples of field operations 1210 include forming/drilling a wellbore, hydraulic fracturing, producing through the wellbore, injecting fluids (such as water) through the wellbore, to name a few. In some implementations, methods of the present disclosure can trigger or control the field operations 1210. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 1210 and responsively triggering the field operations 1210 including, for example, generating plans and signals that provide feedback to and control physical components of the field operations 1210. Alternatively or in addition, the field operations 1210 can trigger the methods of the present disclosure. For example, implementing physical components (including, for example, hardware, such as sensors) deployed in the field operations 1210 can generate plans and signals that can be provided as input or feedback (or both) to the methods of the present disclosure.

Examples of computational operations 1212 include one or more computer systems 1220 that include one or more processors and computer-readable media (e.g., non-transitory computer-readable media) operatively coupled to the one or more processors to execute computer operations to perform the methods of the present disclosure. The computational operations 1212 can be implemented using one or more databases 1218, which store data received from the field operations 1210 and/or generated internally within the computational operations 1212 (e.g., by implementing the methods of the present disclosure) or both. For example, the one or more computer systems 1220 process inputs from the field operations 1210 to assess conditions in the physical world, the outputs of which are stored in the databases 1218. For example, seismic sensors of the field operations 1210 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 1212 where they are stored in the databases 1218 and analyzed by the one or more computer systems 1220.

In some implementations, one or more outputs 1222 generated by the one or more computer systems 1220 can be provided as feedback/input to the field operations 1210 (either as direct input or stored in the databases 1218). The field operations 1210 can use the feedback/input to control physical components used to perform the field operations 1210 in the real world. In examples, the one or more outputs 1222 are edited well logs, and the computational operations 1212 or the computer systems 1220 perform automatic geophysical log quality ranking and data editing with machine learning.

For example, the computational operations 1212 can process the seismic data to generate three-dimensional (3D) maps of the subsurface formation. In examples, the seismic data is edited with machine learning. The computational operations 1212 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 1212 to process new information about the formation and control the drilling to adjust to the observed conditions in real-time. In examples, the new information is edited with machine learning.

The one or more computer systems 1220 can update the 3D maps of the subsurface formation as information from one exploration well is received and the computational operations 1212 can adjust the location of the next exploration well based on the updated 3D maps. Similarly, the data received from production operations can be used by the computational operations 1212 to control components of the production operations. For example, production well and pipeline data can be analyzed to predict slugging in pipelines leading to a refinery and the computational operations 1212 can control machine operated valves upstream of the refinery to reduce the likelihood of plant disruptions that run the risk of taking the plant offline. In examples, production well and pipeline data is edited with machine learning.

In some implementations of the computational operations 1212, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 13:
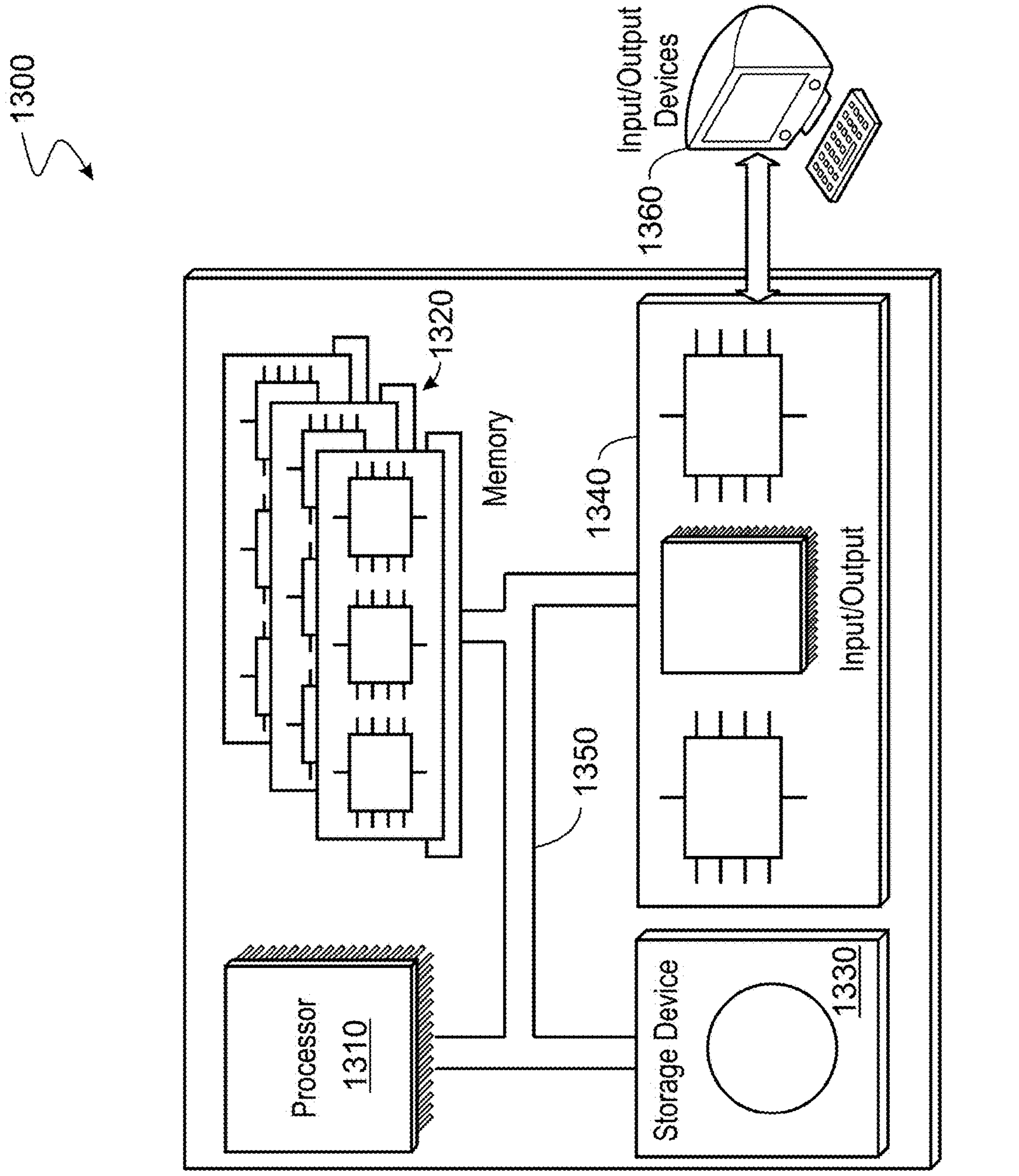
FIG. 13 is a schematic illustration of an example controller (or control system) for that enables data editing.

FIG. 13 is a schematic illustration of an example controller 1300 (or control system) for that enables automatic geophysical log quality ranking and data editing with machine learning. For example, the controller 1300 may be operable according to the workflow 100 of FIG. 1 or the process 1110 of FIG. 11. In some embodiments, the controller 1300 is the same as or similar to the computer systems 1220 of FIG. 12. The controller 1300 is intended to include various forms of digital computers, such as printed circuit boards (PCB), processors, digital circuitry, or otherwise parts of a system for supply chain alert management. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 1300 includes a processor 1310, a memory 1320, a storage device 1330, and an input/output interface 1340 communicatively coupled with input/output devices 1360 (for example, displays, keyboards, measurement devices, sensors, valves, pumps). Each of the components 1310, 1320, 1330, and 1340 are interconnected using a system bus 1350. The processor 1310 is capable of processing instructions for execution within the controller 1300. The processor may be designed using any of a number of architectures. For example, the processor 1310 may be a CISC (Complex Instruction Set Computers) processor, a RISC (Reduced Instruction Set Computer) processor, or a MISC (Minimal Instruction Set Computer) processor. In one implementation, the processor 1310 is a single-threaded processor.

In another implementation, the processor 1310 is a multi-threaded processor. The processor 1310 is capable of processing instructions stored in the memory 1320 or on the storage device 1330 to display graphical information for a user interface on the input/output interface 1340.

The memory 1320 stores information within the controller 1300. In one implementation, the memory 1320 is a computer-readable medium. In one implementation, the memory 1320 is a volatile memory unit. In another implementation, the memory 1320 is a nonvolatile memory unit.

The storage device 1330 is capable of providing mass storage for the controller 1300. In one implementation, the storage device 1330 is a computer-readable medium. In various different implementations, the storage device 1330 may be a floppy disk device, a hard disk device, an optical disk device, or a tape device.

The input/output interface 1340 provides input/output operations for the controller 1300. In one implementation, the input/output devices 1360 includes a keyboard and/or pointing device. In another implementation, the input/output devices 1360 includes a display unit for displaying graphical user interfaces.

There can be any number of controllers 1300 associated with, or external to, a computer system containing controller 1300, with each controller 1300 communicating over a network. Further, the terms "client," "user," and other appropriate terminology can be used interchangeably, as appropriate, without departing from the scope of the present disclosure. Moreover, the present disclosure contemplates that many users can use one controller 1300 and one user can use multiple controllers 1300.

Embodiments

According to some non-limiting embodiments or examples, provided is a computer-implemented method that enables data editing, including: determining cutoffs associated with a differential caliper log and cutoffs associated with a density correction log; applying the cutoffs to a cross-plot of a differential caliper log and a density correction log; categorizing a quality of respective datapoints in the cross-plot according to a confidence level; training a machine learning model using good quality datapoints with a high confidence level as determined using the cutoffs; and replacing datapoints of a well log that are bad quality with a high confidence level using datapoints generated by the trained machine learning model to output an edited well log in real-time.

According to some non-limiting embodiments or examples, provided is an apparatus including a non-transitory, computer readable, storage medium that stores instructions that, when executed by at least one processor, cause the at least one processor to perform operations including: determining cutoffs associated with a differential caliper log and cutoffs associated with a density correction log; applying the cutoffs to a cross-plot of a differential caliper log and a density correction log; categorizing a quality of respective datapoints in the cross-plot according to a confidence level; training a machine learning model using good quality datapoints with a high confidence level as determined using the cutoffs; and replacing datapoints of a well log that are bad quality with a high confidence level using datapoints generated by the trained machine learning model to output an edited well log in real-time.

According to some non-limiting embodiments or examples, provided is a system, including: one or more memory modules; one or more hardware processors communicably coupled to the one or more memory modules, the one or more hardware processors configured to execute instructions stored on the one or more memory modules to perform operations including: determining cutoffs associated with a differential caliper log and cutoffs associated with a density correction log; applying the cutoffs to a cross-plot of a differential caliper log and a density correction log; categorizing a quality of respective datapoints in the cross-plot according to a confidence level; training a machine learning model using good quality datapoints with a high confidence level as determined using the cutoffs; and replacing datapoints of a well log that are bad quality with a high confidence level using datapoints generated by the trained machine learning model to output an edited well log in real-time.

Further non-limiting aspects or embodiments are set forth in the following numbered embodiments:

Embodiment 1: A computer-implemented method that enables data editing, including: determining cutoffs associated with a differential caliper log and cutoffs associated with a density correction log; applying the cutoffs to a cross-plot of a differential caliper log and a density correction log; categorizing a quality of respective datapoints in the cross-plot according to a confidence level; training a machine learning model using good quality datapoints with a high confidence level as determined using the cutoffs; and replacing datapoints of a well log that are bad quality with a high confidence level using datapoints generated by the trained machine learning model to output an edited well log in real-time.

Embodiment 2: The computer implemented method of any preceding embodiment, wherein determining cutoffs associated with the differential caliper log and cutoffs associated with the density correction log includes: applying Gaussian mixture models to each of the differential caliper log and the density correction log, respectively; and determining inflection points of cumulative probability density functions derived from the Gaussian mixture models, wherein the inflection points correspond to cutoffs associated with the differential caliper log and cutoffs associated with the density correction log.

Embodiment 3: The computer implemented method of any preceding embodiment, wherein the well log is a bulk density log or a sonic log, and the trained machine learning model outputs an edited bulk density log or an edited sonic log.

Embodiment 4: The computer implemented method of any preceding embodiment, including replacing low confidence datapoints of the well log when a difference between a datapoint output by the trained machine learning model and a respective low confidence datapoint from the well log satisfies a predefined threshold.

Embodiment 5: The computer implemented method of any preceding embodiment, including training a plurality of machine learning models, and executing the trained machine learning models with different combinations of hyperparameters, and selecting a trained machine learning model based on a prediction accuracy of the plurality of trained machine learning models.

Embodiment 6: The computer implemented method of any preceding embodiment, wherein the confidence level is a high confidence level of good quality datapoints that satisfy high cutoffs and low cutoffs as derived from the differential caliper log and the density correction log.

Embodiment 7: The computer implemented method of any preceding embodiment, wherein the confidence level is a high confidence level of bad quality datapoints that do not satisfy high cutoffs and low cutoffs as derived from the differential caliper log and the density correction log.

Embodiment 8: An apparatus including a non-transitory, computer readable, storage medium that stores instructions that, when executed by at least one processor, cause the at least one processor to perform operations including: determining cutoffs associated with a differential caliper log and cutoffs associated with a density correction log; applying the cutoffs to a cross-plot of a differential caliper log and a density correction log; categorizing a quality of respective datapoints in the cross-plot according to a confidence level; training a machine learning model using good quality datapoints with a high confidence level as determined using the cutoffs; and replacing datapoints of a well log that are bad quality with a high confidence level using datapoints generated by the trained machine learning model to output an edited well log in real-time.

Embodiment 9: The apparatus of any preceding embodiment, wherein determining cutoffs associated with the differential caliper log and cutoffs associated with the density correction log includes: applying Gaussian mixture models to each of the differential caliper log and the density correction log, respectively; and determining inflection points of cumulative probability density functions derived from the Gaussian mixture models, wherein the inflection points correspond to cutoffs associated with the differential caliper log and cutoffs associated with the density correction log.

Embodiment 10: The apparatus of any preceding embodiment, wherein the well log is a bulk density log or a sonic log, and the trained machine learning model outputs an edited bulk density log or an edited sonic log.

Embodiment 11: The apparatus of any preceding embodiment, including replacing low confidence datapoints of the well log when a difference between a datapoint output by the trained machine learning model and a respective low confidence datapoint from the well log satisfies a predefined threshold.

Embodiment 12: The apparatus of any preceding embodiment, including training a plurality of machine learning models, and executing the trained machine learning models with different combinations of hyperparameters, and selecting a trained machine learning model based on a prediction accuracy of the plurality of trained machine learning models.

Embodiment 13: The apparatus of any preceding embodiment, wherein the confidence level is a high confidence level of good quality datapoints that satisfy high cutoffs and low cutoffs as derived from the differential caliper log and the density correction log.

Embodiment 14: The apparatus of any preceding embodiment, wherein the confidence level is a high confidence level of bad quality datapoints that do not satisfy high cutoffs and low cutoffs as derived from the differential caliper log and the density correction log.

Embodiment 15: A system, including: one or more memory modules; one or more hardware processors communicably coupled to the one or more memory modules, the one or more hardware processors configured to execute instructions stored on the one or more memory modules to perform operations including: determining cutoffs associated with a differential caliper log and cutoffs associated with a density correction log; applying the cutoffs to a cross-plot of a differential caliper log and a density correction log; categorizing a quality of respective datapoints in the cross-plot according to a confidence level; training a machine learning model using good quality datapoints with a high confidence level as determined using the cutoffs; and replacing datapoints of a well log that are bad quality with a high confidence level using datapoints generated by the trained machine learning model to output an edited well log in real-time.

Embodiment 16: The system of any preceding embodiment, wherein determining cutoffs associated with the differential caliper log and cutoffs associated with the density correction log includes: applying Gaussian mixture models to each of the differential caliper log and the density correction log, respectively; and determining inflection points of cumulative probability density functions derived from the Gaussian mixture models, wherein the inflection points correspond to cutoffs associated with the differential caliper log and cutoffs associated with the density correction log.

Embodiment 17: The system of any preceding embodiment, wherein the well log is a bulk density log or a sonic log, and the trained machine learning model outputs an edited bulk density log or an edited sonic log.

Embodiment 18: The system of any preceding embodiment, including replacing low confidence datapoints of the well log when a difference between a datapoint output by the trained machine learning model and a respective low confidence datapoint from the well log satisfies a predefined threshold.

Embodiment 19: The system of any preceding embodiment, including training a plurality of machine learning models, and executing the trained machine learning models with different combinations of hyperparameters, and selecting a trained machine learning model based on a prediction accuracy of the plurality of trained machine learning models.

Embodiment 20: The system of any preceding embodiment, wherein the confidence level is a high confidence level of good quality datapoints that satisfy high cutoffs and low cutoffs as derived from the differential caliper log and the density correction log.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship. Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method that enables data editing, comprising:

determining cutoffs associated with a differential caliper log and cutoffs associated with a density correction log;

applying the cutoffs to a cross-plot of a differential caliper log and a density correction log;

categorizing a quality of respective datapoints in the cross-plot according to a confidence level;

training a machine learning model using good quality datapoints with a high confidence level as determined using the cutoffs; and replacing datapoints of a well log that are bad quality with a high confidence level using datapoints generated by the trained machine learning model to output an edited well log in real-time.

2. The computer implemented method of claim 1, wherein determining cutoffs associated with the differential caliper log and cutoffs associated with the density correction log comprises:

applying Gaussian mixture models to each of the differential caliper log and the density correction log, respectively; and determining inflection points of cumulative probability density functions derived from the Gaussian mixture models, wherein the inflection points correspond to cutoffs associated with the differential caliper log and cutoffs associated with the density correction log.

3. The computer implemented method of claim 1, wherein the well log is a bulk density log or a sonic log, and the trained machine learning model outputs an edited bulk density log or an edited sonic log.

4. The computer implemented method of claim 1, comprising replacing low confidence datapoints of the well log when a difference between a datapoint output by the trained machine learning model and a respective low confidence datapoint from the well log satisfies a predefined threshold.

5. The computer implemented method of claim 1, comprising training a plurality of machine learning models, and executing the trained machine learning models with different combinations of hyperparameters, and selecting a trained machine learning model based on a prediction accuracy of the plurality of trained machine learning models.

6. The computer implemented method of claim 1, wherein the confidence level is a high confidence level of good quality datapoints that satisfy high cutoffs and low cutoffs as derived from the differential caliper log and the density correction log.

7. The computer implemented method of claim 1, wherein the confidence level is a high confidence level of bad quality datapoints that do not satisfy high cutoffs and low cutoffs as derived from the differential caliper log and the density correction log.

8. An apparatus comprising a non-transitory, computer readable, storage medium that stores instructions that, when executed by at least one processor, cause the at least one processor to perform operations comprising:

determining cutoffs associated with a differential caliper log and cutoffs associated with a density correction log;

applying the cutoffs to a cross-plot of a differential caliper log and a density correction log;

categorizing a quality of respective datapoints in the cross-plot according to a confidence level;

training a machine learning model using good quality datapoints with a high confidence level as determined using the cutoffs; and replacing datapoints of a well log that are bad quality with a high confidence level using datapoints generated by the trained machine learning model to output an edited well log in real-time.

9. The apparatus of claim 8, wherein determining cutoffs associated with the differential caliper log and cutoffs associated with the density correction log comprises:

applying Gaussian mixture models to each of the differential caliper log and the density correction log, respectively; and determining inflection points of cumulative probability density functions derived from the Gaussian mixture models, wherein the inflection points correspond to cutoffs associated with the differential caliper log and cutoffs associated with the density correction log.

10. The apparatus of claim 8, wherein the well log is a bulk density log or a sonic log, and the trained machine learning model outputs an edited bulk density log or an edited sonic log.

11. The apparatus of claim 8, comprising replacing low confidence datapoints of the well log when a difference between a datapoint output by the trained machine learning model and a respective low confidence datapoint from the well log satisfies a predefined threshold.

12. The apparatus of claim 8, comprising training a plurality of machine learning models, and executing the trained machine learning models with different combinations of hyperparameters, and selecting a trained machine learning model based on a prediction accuracy of the plurality of trained machine learning models.

13. The apparatus of claim 8, wherein the confidence level is a high confidence level of good quality datapoints that satisfy high cutoffs and low cutoffs as derived from the differential caliper log and the density correction log.

14. The apparatus of claim 8, wherein the confidence level is a high confidence level of bad quality datapoints that do not satisfy high cutoffs and low cutoffs as derived from the differential caliper log and the density correction log.

15. A system, comprising:

one or more memory modules;

one or more hardware processors communicably coupled to the one or more memory modules, the one or more hardware processors configured to execute instructions stored on the one or more memory modules to perform operations comprising:

determining cutoffs associated with a differential caliper log and cutoffs associated with a density correction log;

applying the cutoffs to a cross-plot of a differential caliper log and a density correction log;

categorizing a quality of respective datapoints in the cross-plot according to a confidence level;

training a machine learning model using good quality datapoints with a high confidence level as determined using the cutoffs; and replacing datapoints of a well log that are bad quality with a high confidence level using datapoints generated by the trained machine learning model to output an edited well log in real-time.

16. The system of claim 15, wherein determining cutoffs associated with the differential caliper log and cutoffs associated with the density correction log comprises:

applying Gaussian mixture models to each of the differential caliper log and the density correction log, respectively; and determining inflection points of cumulative probability density functions derived from the Gaussian mixture models, wherein the inflection points correspond to cutoffs associated with the differential caliper log and cutoffs associated with the density correction log.

17. The system of claim 15, wherein the well log is a bulk density log or a sonic log, and the trained machine learning model outputs an edited bulk density log or an edited sonic log.

18. The system of claim 15, comprising replacing low confidence datapoints of the well log when a difference between a datapoint output by the trained machine learning model and a respective low confidence datapoint from the well log satisfies a predefined threshold.

19. The system of claim 15, comprising training a plurality of machine learning models, and executing the trained machine learning models with different combinations of hyperparameters, and selecting a trained machine learning model based on a prediction accuracy of the plurality of trained machine learning models.

20. The system of claim 15, wherein the confidence level is a high confidence level of good quality datapoints that satisfy high cutoffs and low cutoffs as derived from the differential caliper log and the density correction log.

* * * * *